United States Patent [19]

Rutschke et al.

[11] 3,858,892

[45] Jan. 7, 1975

[54] TOOL HOLDER EQUIPPED WITH A CODE CARRIER

[75] Inventors: Arno Rutschke, Zurich; Erich Grabher, Dietlikon, both of Switzerland

[73] Assignee: Werkzeugmaschinenfabrik Oerlikon-Buhrle AG, Zurich, Switzerland

[22] Filed: Sept. 18, 1972

[21] Appl. No.: 289,801

[30] Foreign Application Priority Data
Oct. 1, 1971 Switzerland.................... 14325/71

[52] U.S. Cl................. 279/1 TS, 29/568, 33/181 R
[51] Int. Cl............................................... G01b 5/14
[58] Field of Search.......... 29/568, 26 A; 279/1 TS, 279/103; 33/185 R, 181 R

[56] References Cited
UNITED STATES PATENTS

| | | | |
|---|---|---|---|
| 3,163,291 | 12/1964 | Gleisner, Jr. | 29/568 X |
| 3,173,204 | 3/1962 | Anthony | 29/568 |
| 3,449,823 | 6/1969 | Jerue | 29/568 |
| 3,545,075 | 12/1970 | Ollearo | 29/568 |
| 3,691,655 | 9/1972 | Kurimoto et al. | 29/568 |

Primary Examiner—Andrew R. Juhasz
Assistant Examiner—Z. R. Bilinsky
Attorney, Agent, or Firm—Werner W. Kleeman

[57] ABSTRACT

A tool holder with a code carrier and a body member for supporting a tool, said body member being provided with internal threading. A pin is threaded into the internal threading of the body member and serves to secure the tool holder, and the code carrier is arranged upon this pin.

4 Claims, 5 Drawing Figures

TOOL HOLDER EQUIPPED WITH A CODE CARRIER

BACKGROUND OF THE INVENTION

The present invention relates to a new and improved construction of tool holder with a code carrier or support and a body member for holding the tool, the body member being provided with internal threading.

According to a known prior art construction of tool holder of this type the coding thereof occurs in that a number of rings are pushed onto a cylindrical part of the tool holder and secured in axial direction. In this connection there are arranged two different types of rings with different external diameter according to a code. By means of the code, there is characterized or marked a tool retained at the tool holder. This known coding technique with rings requires an appropriate construction of the tool holder because these rings are arranged upon the tool holder. The aforementioned code cannot, for instance, be applied to a steep-angle taper tool holder according to ISO-standards (International Organization For Standardization).

SUMMARY OF THE INVENTION

Hence, it is a primary object of the present invention to provide an improved construction of tool holder having a code carrier which is not associated with the aforementioned drawbacks and limitations of the prior art proposals.

Another and more specific object of the present invention is to render accessible to coding standardized already existing tool holders without any subsequent processing or machining thereof.

Now in order to implement these and still further objects of the invention, which will become more readily apparent as the description proceeds, the invention contemplates that a pin or plug is threaded into the internal threading of the body member, this pin serving for the attachment of the tool holder, and a code is applied to such pin.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
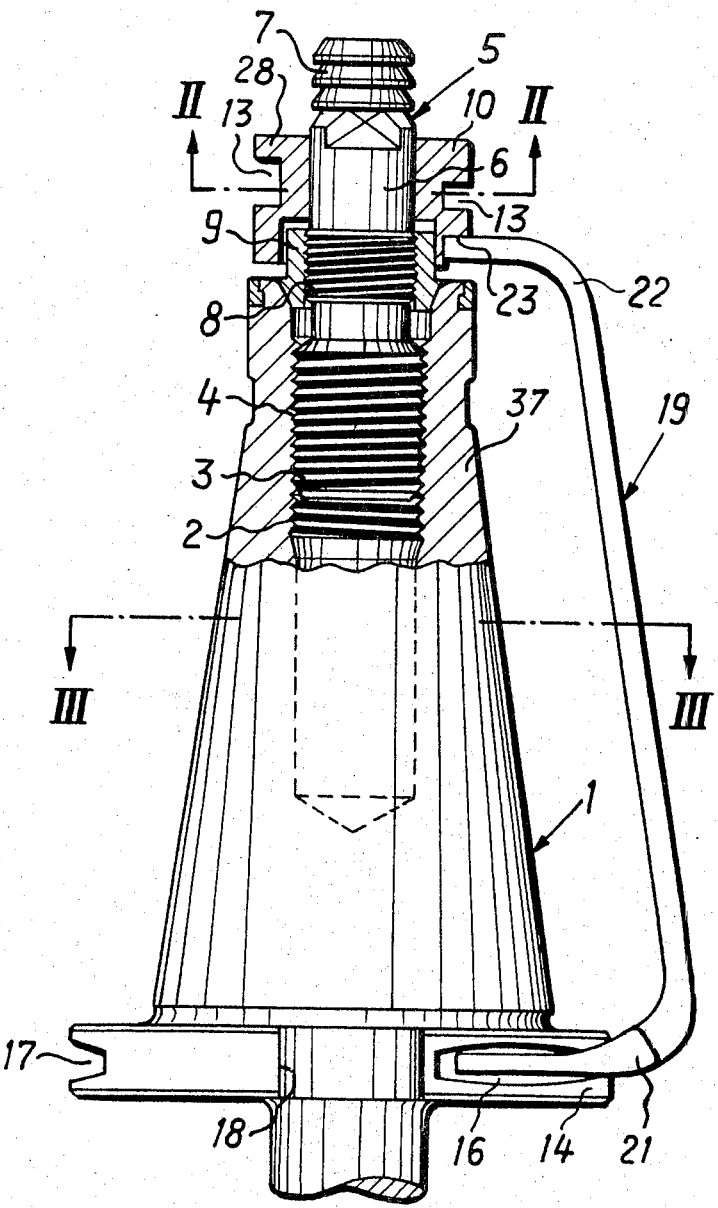
FIG. 1 schematically illustrates, partially in sectional view, a standardized tool holder equipped with coding.
Figure 2:
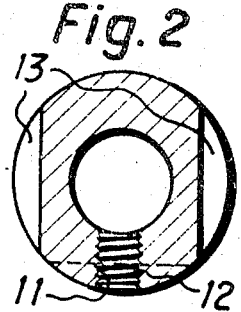
FIG. 2 is a cross-sectional view of the tool holder depicted in FIG. 1, taken substantially along the line II—II thereof.

Describing now the drawings, in FIG. 1 there is illustrated by way of explanation a standardized tool holder 1 having a body member 37 equipped with internal threading 2. A pin or plug 5 provided at its rear portion 3 with threading 4 is threadably connected with the internal threading 2 of the body member 37. The pin 5 is equipped at its central portion with a cylindrical surface 6 and at its front portion this pin 5 is provided with transverse ribs 7 to enable it to be gripped by any suitable and therefore not particularly illustrated gripper element and to be drawn into the work or main spindle. At the central or middle portion of the pin 5 there is arranged further threading 8 which is in engagement with a check or counter nut 9. This counter or check nut 9 bears upon the tool holder 1 and secures the pin 5 against rotation. A sleeve member 10 forming a code carrier or support is pushed over the smooth cylindrical surface 6 of the pin 5 and secured at such pin 5 by means of a screw 12 or equivalent structure threaded into a radially directed threaded bore 11 (FIG. 2). At the periphery of this sleeve member 10 there are arranged slots 13 which extend tangentially to the sleeve member 10 and perpendicular to the axis of such sleeve member. The slots 13 are arranged at diametrically opposite locations at the periphery of sleeve member 10. If desired two groups of slots 13 could be arranged at such diametrically opposed locations.

Figure 3:
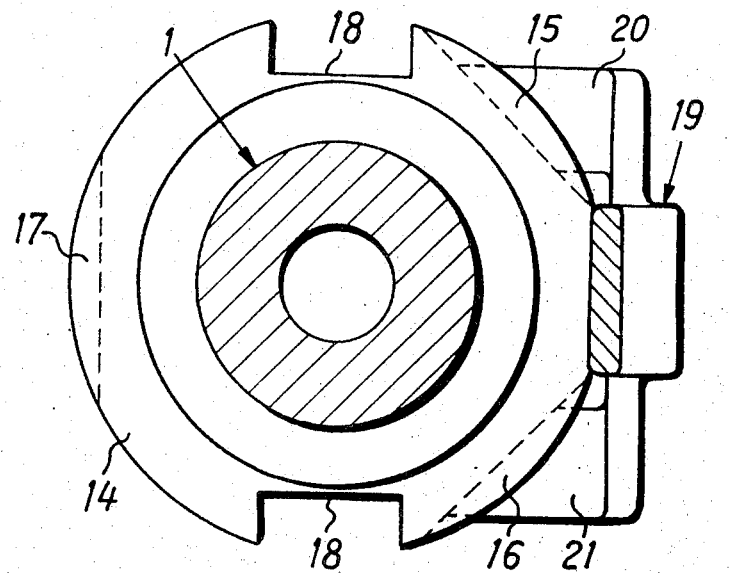
FIG. 3 is a cross-sectional view of the tool holder depicted in FIG. 1, taken substantially along the line III—III thereof.

According to the showing of FIGS. 1 and 3, the tool holder 1 possesses a flange 14. At the periphery of the flange 14 there are cut or otherwise appropriately machined three grooves 15, 16 and 17. These grooves 15 to 17 extend tangentially with respect to the flange 14 and perpendicular to the axis of the tool holder 1. The bases of the grooves 15 to 17 bear upon the sides of an isosceles triangle. Both of the grooves 15 and 16 are arranged 90° offset with regard to one another, the third groove 17 is arranged offset with respect to each of both of the other grooves 15 and 16 respectively through an angle of 135°. Two recesses 18 serving for entraining the tool holder 1 at the work spindle and for the positionally correct fixing thereof at a magazine are arranged at the flange 14 in diagonally opposed relationship between both grooves 15 and 16 and the third groove 17. The three grooves 15 to 17 are provided for the purpose of engaging the tool holder 1 during a tool change operation by means of a non-illustrated gripper clamp and to transport such between the work spindle and the tool magazine. Details of the cooperation of the gripper clamp with the tool holder constitutes subject matter of the copending commonly assigned U.S. application, Ser. No. 289,800 filed Sept. 18, 1972, and entitled TOOL CHANGE MECHANISM, to which reference may be readily had.

The pin 5 is adjusted in axial direction by means of a non-illustrated caliper or gauge relative to the tool holder 1 and fixed by means of the check nut 9 at the tool holder 1. Thereafter, the sleeve member 10 is axially and radially adjusted at the pin 5 with the aid of a caliper or gauge 19 and fixed by means of the screw 12. To this end the caliper 19 possesses two lower arms 20 and 21 which can be brought into engagement with the grooves 15 and 16 respectively at the flange 14. An upper flexed arm 22 of caliper 19 is brought into engagement with a recess 23 at the sleeve member 10, so that its radial axial position is fixed. The slots 13 are exactly parallely directed with regard to the plane of symmetry extending through the recesses 18 at the flange 14, and in axial direction the slots 13 exhibit an exactly defined spacing from the flange 14.

Figure 5:
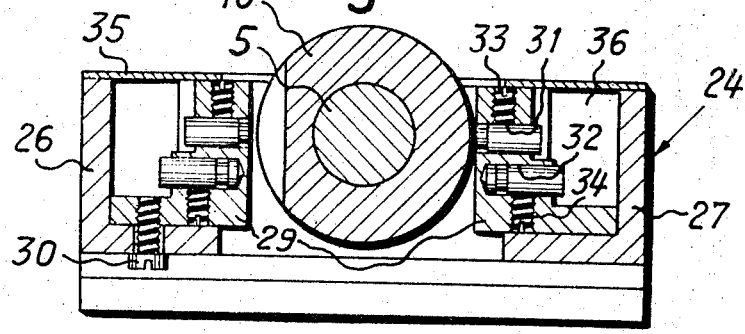
FIG. 5 is a cross-sectional view of the arrangement of FIG. 4, taken substantially along the line V—V thereof.
Figure 4:
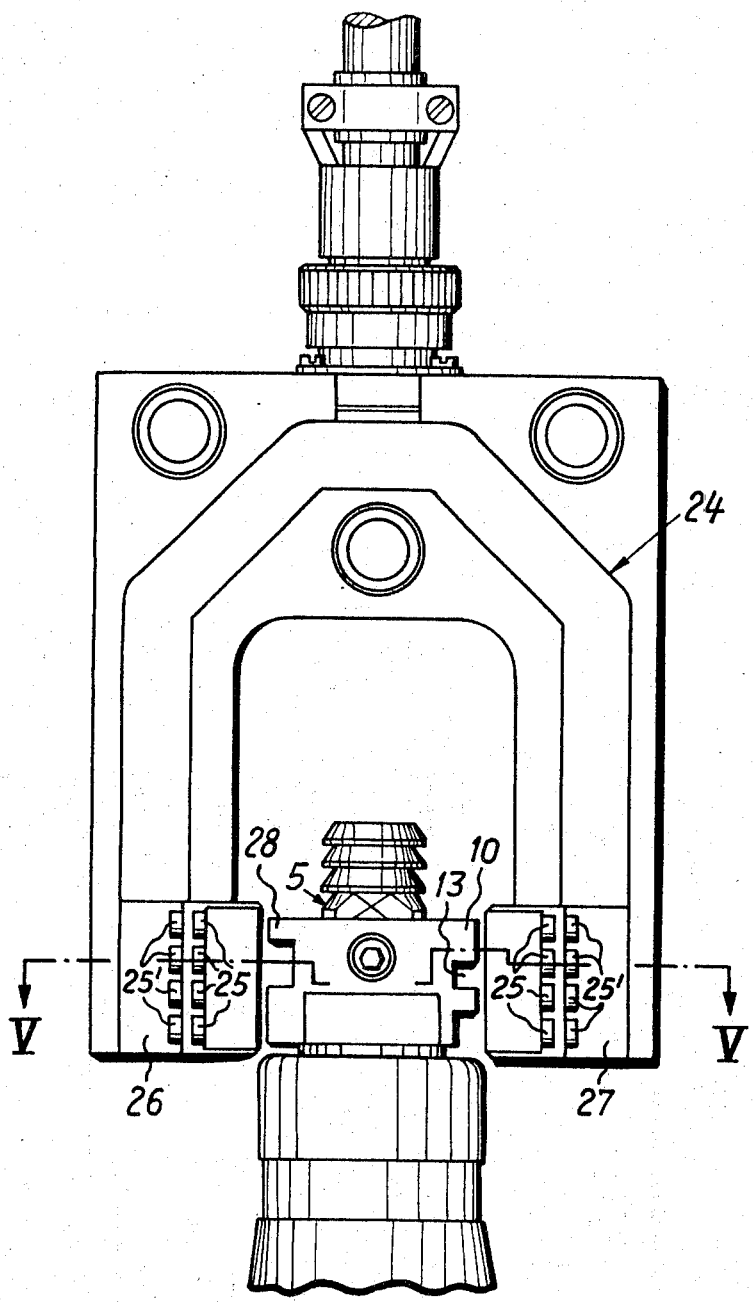
FIG. 4 schematically illustrates a forked or bifurcated member having scanning elements for scanning the code at the tool holder.

According to the showing of FIGS. 4 and 5, there is provided a bifurcated or fork-shaped carrier or support 24 with forked ends 26 and 27 having a substantially L-shaped profile. Two likewise L-shaped carriers or supports 29 are connected by means of screws 30 with the L-shaped forked ends 26 and 27 in such a manner that the components 26, 27, 29 form U-shaped carrier 24. The L-shaped carrier 29 possesses four continuous bores 31 arranged behind one another and therebelow in each case a respective blind hole bore 32. In both bores 31 and 32 there are arranged confronting inductive measurement value transmitters 25, 25' which are operated by any suitable reference circuit. The measurement value transmitters 25 and 25' are fixedly clamped at the bores 31 and 32 respectively by adjusting screws 33 and 34 respectively. A small cover plate 35 closes towards the top the U-shaped carrier 24 formed by the components 26, 27, 29, so that there is formed a closed channel 36 through which there can be led towards the outside of the bifurcated member 24 non-illustrated electrical connections or leads from the measurement value transmitters 25, 25'.

The tool holder 1 with the pin 5 and the sleeve member 10 is moved perpendicular to the plane spanned by the forked ends 26, 27 and therebetween, whereby the code represented by the slots 13 and the raised portions 28 of the sleeve 10 is moved past the measurement value transmitters 25, 25'.

While there is shown and described present preferred embodiments of the invention, it is to be distinctly understood that the invention is not limited thereto but may be otherwise variously embodied and practiced within the scope of the following claims.

Accordingly, what is claimed is:

1. A tool holder comprising an axially extending tool holder body member for holding a tool, said tool holder body member being provided with one end adapted to hold a tool and internal axial threading, an axially extending pin threadably connected with the internal threading of the tool holder body member and serving for the attachment of the tool holder to a tool driving spindle operator, a tool code carrier, said code carrier comprising a sleeve member seated upon said pin, said sleeve member being provided with tangentially directed slots transverse to said axial direction and arranged at diametrically opposite locations above one another at the periphery of the sleeve member, said tool holder body member including a flange adjacent to said tool removable caliper means in engagement with said sleeve and flange for positioning said sleeve member in a predetermined axial and radial direction at the pin with respect to said flange, and means for removably locking said fixed sleeve member in radial and axial direction with respect to the pin.

2. The tool holder as defined in claim 1, wherein said sleeve member is provided with a radially directed threaded bore and a set screw threaded in said bore for securing the sleeve member at the pin.

3. The tool holder as claimed in claim 1, wherein said sleeve and flange are each provided with at least one recess for removably receiving said caliper, said flange is provided with recesses offset through 180° with respect to one another, said caliper serving to align the sleeve member at the pin in radial direction with respect to said recesses and in axial direction with respect to said flange.

4. The tool holder as defined in claim 3, further including a substantially U-shaped fork member having arms, means for scanning the tool holder secured to said arms in confronting relationship to said code carrier, said scanning means comprising measurement value transmitters arranged opposite one another in a plane.

* * * * *